United States Patent Office

2,822,276
Patented Feb. 4, 1958

2,822,276

PROCESS FOR IMPROVING THE TEXTURE OF CANNED MEAT

James M. Blair, Hinsdale, Ill., Edward L. Ter Bush, Bloomington, Ind., and Keith T. Swartz, Villa Park, Ill.

No Drawing. Application April 1, 1955
Serial No. 498,786

4 Claims. (Cl. 99—187)

(Granted under Title 35, U. S. Code (1952), sec. 266)

The invention described herein, if patented, may be manufactured and used by or for the Government for governmental purposes, without the payment to us of any royalty thereon.

This invention concerns a process for improving the texture of canned meat, and a canned meat product prepared in accordance with such process, which meat product is characterized by taste, texture, and sliceability substantially corresponding to that of uncanned meat, even after an extended period of remaining canned.

It is a fact, well known to the consumer and to the trade, that the canning of meat tends to deprive it of its fresh taste and texture, and makes slicing difficult, because of excessive softness of the product which causes it to crumble rather than to form slices.

We have found that these shortcomings can be remedied by adding controlled amounts of albumin and gelatin to meat, prior to canning. The cooperative action of the albumin and gelatin gives the comminuted meat the necessary firmness for slicing, and the moistness which is essential for texture and taste preservation. We are, of course, aware, that it is old to add gelatin to meat prior to canning, and we are also aware of previous attempts to add albumin to meat (without, however, adding gelatin). We have found, however, that the addition of albumin without gelatin results in excessive hardness of the canned product; conversely, the addition of gelatin, without simultaneous addition of albumin, does not eliminate "mushiness" in the canned meat product when heated for serving, and this characteristic greatly lessens its appeal to the majority of consumers, as compared with the corresponding fresh meat product.

The albumin and gelatin may be added to the meat after cooking, or to uncooked meat. If the meat has not been cooked prior to the addition of the albumin and gelatin, it may be cooked prior to canning, or heat-processing of the meat may be effected by heating (retorting) the cans after closing, which usually imparts to the meat a taste resembling that of steam-roasted meat.

It is accordingly an object of the present invention to provide a comminuted uncooked or heat-processed meat composition, adapted for canning, which contains predetermined balanced amounts of added albumin and gelatin, to preserve the taste, texture, and sliceability of the meat product even after extended periods of remaining in cans.

Another object of the invention is a process for improving the texture of canned meat, which involves the addition of wholesome alimentary products readily obtainable on the market, and which comply with pure food and drug laws.

A further object of the invention is a process which can be practiced even by unskilled meat packing personnel upon compliance with simple and easy-to-understand directions, and which does not necessitate investment in additional food machinery on the part of the meat packer.

Yet another object of the invention is the preservation of a canned meat product which is highly adapted for overseas shipment, e. g. for purposes of military rations, commercial export, or civilian relief, and which can be converted, upon reheating, into meat dishes substantially equivalent to dishes prepared from fresh meat.

Other objects and advantages of our invention will become readily apparent from the ensuing description of our invention.

Our invention is applicable to a large variety of canned meat products such as, for instance, canned beef, pork, or fowl, such as canned precooked chicken meat or canned turkey meat; or fish, such as canned precooked salmon or tuna; thus, the term "meat" as employed herein is used in the broad sense as including fowl and fish.

Furthermore, our invention can be used in conjunction with the canning of meats which were previously heat-processed in a variety of conventional ways, such as boiling, roasting, frying, etc. Thus, parboiled or steam-roasted beef, processed in accordance with our invention, and canned, may subsequently be reheated to provide a meat course which can be sliced into individual meat dishes having a flavor and texture substantially corresponding to fresh roast beef.

As the result of numerous experiments, it was found by us that the amount of albumin added to the heat-processed and comminuted meat in accordance with our invention, must be at least about equal, on a solids basis, to the weight of the added gelatin, and that the necessary amount of added gelatin is from about 2.5 to about 5 parts by weight of the entire meat composition prior to canning. An optimum ratio of albumin solids to gelatin was found by us to be about 2.8:1; however, this ratio can be varied within the approximate limits of 1:1 to 4:1, as set forth.

While we generally prefer the use of egg albumen solids because of their ease of handling and favorable taste characteristics, other albumins, such as blood albumin or equivalent, can be used. Particularly in those types of canned meat which contain all or a large proportion of ground pork meat, blood albumin can be used in accordance with the present invention, particularly if a small amount of spices is added to mask the flavor of the blood albumin, which is disliked by some consumers.

The addition of a small amount of meat broth and salt is desirable; these liquids are maintained in intimate association with the comminuted meat by the added gelatin component. The added albumin component counteracts the softening tendency of the other added components, and provides a firm and readily sliceable composition which, however, is protected from excessive hardness by the added gelatin component. The heat-processed and comminuted meat component of the composition should ordinarily be at least about 75% by weight of the entire composition, the remainder being added albumin and gelatin in the proportions as herein disclosed (about 2½–5% gelatin and about 1 to 4 times that amount of albumin on a solids basis, i. e., about 2½–20% of albumin solids), and, when desired, added meat broth (or water) and salt. While ordinarily it will not be necessary to include more than about 10% albumin in the composition, this percentage may be exceeded where experience shows an unusual tendency of the canned product to become mushy after reheating.

The following specific examples illustrate several ways of practicing our invention; however, it will be understood, of course, that these examples are given by way of illustration and not for the purpose of limiting our invention to the specific materials, proportions, or procedures herein stated.

*Example 1*

Equal proportion of boneless beef rounds and chucks were cut into 1½" strips, shrunk in boiling water to about 75% of original weight, and ground through a 1½" x 2" kidney plate. Salt was dissolved in the beef broth and then poured over the ground meat. Gelatin (275° Bloom) was then added, mixed mechanically, and followed by the dried egg albumen solids, which were likewise mixed mechanically with the remainder of the composition. The combined ingredients were packed tightly into silicone-parchment-lined cans (7 lbs. per can) leaving about ¼" head space.. The cans were sealed under 24" vacuum and processed in steam at 240° F. for 4¼ hours.

The proportions of the ingredients of the composition were:

| | Percent |
|---|---|
| Beef, precooked and ground | 81.75 |
| Egg albumen solids | 8.50 |
| Gelatin | 3.00 |
| Beef broth | 5.00 |
| Salt | 1.75 |

After several weeks storage, the cans were opened, and their contents were heated and sliced. They were found to form slices of any desired thickness or thinness, and to possess a texture and flavor closely resembling fresh roast beef.

The following additional examples were prepared:

| | Parts by Weight, About | | | | |
|---|---|---|---|---|---|
| | Example 2 | Example 3 | Example 4 | Example 5 | Example 6 |
| Beef, precooked and ground | 83.0 | 80.0 | 87.0 | 77.5 | 80.5 |
| Egg Albumen solids | 7.0 | 10.0 | 3.0 | 10.0 | 7.0 |
| Gelatin | 2.5 | 2.5 | 2.5 | 5.0 | 5.0 |
| Beef broth | 5.0 | 5.0 | 5.0 | 5.0 | 5.0 |
| Salt | 2.5 | 2.5 | 2.5 | 2.5 | 2.5 |

The compositions were packed into enameled cans, lined with silicone-treated parchment, sealed under 15" of vacuum, and processed in steam for 95 minutes at 240° F. After several weeks storage, the cans were opened and their contents were sliced and examined in the hot and cold state by a panel of food technologists. All examples were highly acceptable; Example 2 was preferred by a majority of the panel members as most closely resembling fresh sliced roast beef (hot or cold). Thus, a preferred formulation is a canned precooked and ground beef composition based on the combined data of Examples 1 and 2 is:

| | Parts by weight, about |
|---|---|
| Heat-processed comminuted beef | 81.75–83.00 |
| Albumen, solids (egg albumen) | 7.00–8.50 |
| Gelatin | 2.50–3.00 |
| Beef broth and salt | 6.75–7.50 |
| Total | 100 |

*Example 7*

A frankfurter meat composition was prepared by making a meat emulsion from equal proportions of finely ground uncooked beef and pork and adding thereto blood albumin and gelatin in a proportion of about 8.5 parts albumin solids and 3 parts gelatin per 100 parts of the composition, plus conventional amounts of salt and spice (about 3 parts). The composition was filled in casings, smoked, precooked and canned. The product, after several weeks storage, was found to have a taste, texture and sliceability substantially indistinguishable from fresh frankfurters.

*Example 8*

To precooked spiced ground pork meat were added 10 parts of solid blood albumin and 3 parts of gelatin per 100 parts of the composition. The mixture was canned and stored for several weeks. After opening the cans, the contents were sliced into patties and fried. The taste and texture of the fried product were substantially equivalent to fresh pork sausage patties.

*Example 9*

Chicken breast meat was cooked, chopped, mixed with chicken broth and salt, and 5 parts egg albumen solids and 2½ parts gelatin were added per 100 parts of the composition. The chicken meat loaf was vacuum-canned and stored for several weeks. The contents were readily sliceable, and were suitable for making chicken sandwiches (cold) and hot sliced chicken.

The comminution of the raw or heat-processed meat product may be effected by grinding, chopping, cutting or equivalent procedures. While we prefer to add the albumin in the solids state, for ease of handling, we do not wish to limit our invention to this detail inasmuch as a liquid suspension of albumin may be substituted on an equivalent basis (e. g., 5 parts solid albumin may be replaced by 10 parts of a liquid suspension of albumin having a solids content of 50%). The canning of the meat composition may be effected, e. g., by vacuum-canning or by canning in the presence of inert gases such as nitrogen to the displacement of atmospheric oxygen. Storage of the canned meat products can be effected at room temperature over extended periods of time.

From the foregoing description of the principle of our invention and of several preferred examples for carrying the same into practice, it will become readily apparent to the expert that variations and modifications may be made of the same without departing from the spirit of our invention. We therefore desire to claim our invention broadly, and for this purpose define its scope by the appended claims.

We claim:

1. Process for preparing a meat composition characterized by taste, texture, and sliceability, substantially corresponding, after canning, to that of uncanned meat, which comprises: comminuting and heat-processing the meat; mixing gelatin and albumin with the comminuted meat, said gelatin being added in a proportion of about 2.5–5 parts per 100 parts by weight of said meat composition, and said albumin being added in an amount, on a solids basis, equal to about 1 to about 4 times the amount by weight of said gelatin; and canning said meat composition.

2. Process according to claim 1, wherein said albumin is solid egg albumen.

3. Process according to claim 1, wherein said albumin is blood albumin.

4. Process for preparing a meat composition characterized by taste, texture, and sliceability, substantially corresponding, after canning, to that of uncanned meat, which comprises: comminuting and heat-processing the meat; mixing gelatin and albumin with the heat-processed and comminuted meat, said gelatin being added in a proportion of about 2.5–5 parts per 100 parts by weight of said meat composition, and said albumin being added in an amount, on a solids basis, equal to about 2.8 times the amount by weight of said gelatin; and canning said meat composition.

References Cited in the file of this patent

UNITED STATES PATENTS

| 1,740,176 | Hormel et al. | Dec. 17, 1929 |
| 2,171,428 | Griffith et al. | Aug. 29, 1939 |
| 2,230,062 | Jordan | Jan. 28, 1941 |
| 2,447,427 | Oftedahl | Aug. 17, 1948 |
| 2,521,849 | Hopkins et al. | Sept. 12, 1950 |

FOREIGN PATENTS

| 568,250 | Great Britain | Mar. 26, 1945 |